(12) United States Patent
Mossbeck et al.

(10) Patent No.: US 6,176,961 B1
(45) Date of Patent: *Jan. 23, 2001

(54) ADHESIVE BONDING OF STRINGS OF POCKETED COIL SPRINGS

(75) Inventors: Niels S. Mossbeck; Thomas J. Wells, both of Carthage, MO (US)

(73) Assignee: L&P Property Management Company, South Gate, CA (US)

(*) Notice: Under 35 U.S.C. 154(b), the term of this patent shall be extended for 0 days.

This patent is subject to a terminal disclaimer.

(21) Appl. No.: 09/611,288

(22) Filed: Jul. 6, 2000

Related U.S. Application Data (63) Continuation-in-part of application No. 09/524,988, filed on Mar. 14, 2000, which is a continuation-in-part of application No. 09/287,459, filed on Apr. 7, 1999, which is a continuation-in-part of application No. 09/153,445, filed on Sep. 15, 1998.

(51) Int. Cl.⁷ .................................................. B32B 7/14
(52) U.S. Cl. ..................... 156/291; 156/367; 156/368; 156/539; 156/556; 5/716
(58) Field of Search .................. 156/70, 291, 538, 156/539, 543, 556, 367, 368; 5/716

(56) References Cited

U.S. PATENT DOCUMENTS

| | | |
|---|---|---|
| 698,529 | 4/1902 | Marshall . |
| 1,270,840 | 7/1918 | Kelly . |
| 2,862,214 | 12/1958 | Thompson et al. . |
| 3,429,767 | 2/1969 | Bronstein, Jr. et al. . |
| 3,930,929 | 1/1976 | Lingl . |
| 4,234,984 | 11/1980 | Stumpf . |
| 4,401,501 | 8/1983 | Stumpf . |
| 4,439,977 | 4/1984 | Stumpf . |
| 4,451,946 | 6/1984 | Stumpf . |
| 4,523,344 | 6/1985 | Stumpf . |
| 4,566,926 | 1/1986 | Stumpf . |
| 4,578,834 | 4/1986 | Stumpf . |
| 5,016,305 | 5/1991 | Suenens et al. . |
| 5,126,004 | 6/1992 | Suenens et al. . |
| 5,637,178 | 6/1997 | Suenens et al. . |
| 5,740,597 | 4/1998 | Eto . |
| 5,746,877 | 5/1998 | Notheis et al. . |
| 5,792,309 | 8/1998 | Eto . |

*Primary Examiner*—Michael W. Ball
*Assistant Examiner*—Jessica Rossi
(74) *Attorney, Agent, or Firm*—Wood, Herron and Evans, L.L.P.

(57) ABSTRACT

A method and system for manufacturing a spring core by adhesively bonding strings of pocketed coil springs together utilizes a moving adhesive applicator for depositing adhesive onto a moving string of pocketed coil springs. Subsequently, individual strings are adhesively bonded to similar strings to form the spring core of pocketed coil springs. The moving applicator may take one of any number of various embodiments which include reciprocating movement, rotational movement, pivotal movement and/or linear translational movement for spraying a pattern of adhesive onto the moving string of pocketed coil springs. The adhesive may be dispensed in a plurality of parallel lines from a set of nozzles. The nozzles may be moved and turned on and off under the control of a programmed controller.

7 Claims, 7 Drawing Sheets

ADHESIVE BONDING OF STRINGS OF POCKETED COIL SPRINGS

This is a continuation in part of U.S. patent application Ser. No. 09/524,988, filed Mar. 14, 2000, which is a continuation in part of U.S. patent application Ser. No. 09/287,459, filed Apr. 7, 1999, which is a continuation-in-part of U.S. patent application Ser. No. 09/153,445, filed Sep. 15, 1998, each of which are assigned to the assignee of this invention and are hereby incorporated by reference in their entirety.

FIELD OF THE INVENTION

This invention relates generally to the construction of spring interior assemblies, and more particularly, to the manufacture of spring cores of strings of pocketed coil springs for use in mattresses, seat cushions and other such articles.

BACKGROUND OF THE INVENTION

Mattress spring core construction over the years has been a continuously improving art with advancement in materials and machine technology. A well known form of spring core construction is known as a Marshall spring construction wherein metal coil springs are encapsulated in individual pockets of fabric and formed as elongate or continuous strings of pocketed coil springs. In an early form, these strings of coil springs were manufactured by folding an elongate piece of fabric in half lengthwise to form two plies of fabric and stitching transverse and longitudinal seams to join the plies of fabric to define pockets in which the springs were enveloped.

Recently, improvements in spring core constructions have included the use of fabrics which are thermally or ultrasonically weldable to themselves. By using such welding techniques, these fabrics have been used advantageously on a mass production basis to more efficiently manufacture strings of individually pocketed coil springs wherein transverse and longitudinal welds replace stitching to form pockets encapsulating the springs.

The manufacture of strings of pocketed coil springs with a single spring in each pocket is well known in the art and, for example, such machines and systems are commercially available from Spühl AG in Switzerland. Examples of such machines include the Spühl TF 90, 190 and 290 series machines. Another known system for pocketing coil springs is disclosed in U.S. Pat. No. 4,439,977 which is hereby incorporated by reference in its entirety.

Once strings of pocketed coil springs are manufactured, they may be assembled to form a spring core construction for a mattress, cushion or the like by a variety of methods. For example, multiple or continuous strings may be arranged in a row pattern corresponding to the desired size and shape of a mattress or the like. The adjacent rows of strings may be interconnected by a variety of methods. The result is a unitary assembly of pocketed coil springs serving as a complete spring core assembly. In an early form, the rows or strings of such a unitary assembly of pocketed coil springs were interconnected by mechanical fasteners such as staples, clips, or the like. More recently, various forms of adhesives applied to the side surface of a first row or string of pocketed coil springs are used to bond that row or string to an adjacent row or string and after this is repeated for multiple strings to thereby construct a unitary spring core assembly.

One example of a spring core assembly constructed from a plurality of strings of pocketed coil springs glued together is disclosed in U.S. Pat. No. 4,578,834. Each of the pocketed coil springs in the spring core disclosed in that patent includes a discrete hot melt adhesive deposit on the sidewall thereof. Specific shortcomings associated with that design include the limited bonding strength produced between the adjacent rows of pocketed coil springs because of the individualized discrete deposits of adhesive. Additionally, the requirement of cycling the adhesive applicator rapidly on and off while manufacturing such a spring core assembly can be problematic. Such demands on the adhesive applicator result in frequent maintenance problems and limited and unreliable production capacity.

Spring core constructions manufactured with adjacent strings of pocketed coil springs adhesively bonded together are also disclosed in U.S. Pat. Nos. 4,566,926 and 5,637,178. The system disclosed in the '926 patent includes a hot melt adhesive applicator having a plurality of spray nozzles which apply hot melt adhesive to a selected portion of each pocketed coil spring. The applicator moves longitudinally along the length of a stationary string of pocketed coil springs to apply the hot melt adhesive. On the other hand, the system shown in the '178 patent requires the assembly of spring core constructions from strings of pocketed coil springs in which a first string of coil springs is moved on a conveyor and coated with adhesive sprayed from a fixed adhesive applicator. The manufacturing capacity of each of these systems is limited because of the requirement for a fixed adhesive applicator or a stationary string of pocketed coil springs onto which the adhesive is applied. In those systems, the production of spring core assemblies is the result of a discontinuous or batch like process. Furthermore, the adhesive is not efficiently and optimally applied to the strings of pocketed coil springs for a uniform and unitary spring core assembly.

Further, known systems and methods for adhesively bonding strings together typically bond each pocketed coil spring to each adjacent pocketed coil spring in the adjacent rows. As such, the bonding systems and methods do not allow for customization of the spring unit by varying the bonding scheme to permit differential movement of selected pocketed coil springs relative to selected pocketed springs in adjacent strings or rows.

These identified and other systems provide limited opportunities to manufacture spring core assemblies from pocketed coil springs. There is a need to provide a system and method which can be utilized on a production basis for more complete automation of the procedure for the expeditious and efficient manufacture of spring core assemblies from strings of pocketed coil springs adhesively bonded together while allowing for customization of the spring unit and portions thereof.

SUMMARY OF THE INVENTION

A primary objective of this invention is therefore to provide an improved method and system for the manufacture of spring core assemblies from strings of pocketed coil springs.

A further objective of this invention is to provide such a method and system which is expeditious, efficient, reliable and cost effective for application in a fully automatic production facility utilizing adhesive bonding of the adjacent strings.

A still further objective of this invention is to provide such a method and system which consistently produces appropriately sized and standardized spring core assemblies from strings of pocketed coil springs on a consistent basis and further spring core assemblies which can be customized to include independently deflecting regions of springs.

These and other objectives of the invention have been achieved by a system and method for manufacturing a spring core assembly for use in mattresses, seat cushions or the like. In one embodiment, the method includes moving a first string of pocketed coil springs past a moving adhesive applicator in a direction generally perpendicular to the longitudinal axes of the coil springs and spraying adhesive from the applicator onto a side surface of the moving pocketed coil springs. Advantageously, the adhesive applicator is also moving so the manufacturing method includes a moving adhesive applicator applying adhesive to a moving string of pocketed coils springs to provide a pattern of adhesive on the central portion of each individually pocketed coil spring. The movement of the adhesive applicator allows for enhanced control of the location of the adhesive on the strings without restricting the travel of the strings and the resulting production speed.

Preferably, the movement of the adhesive applicator substantially follows or is synchronized with each pocketed coil spring of the string. In some embodiments of this invention, multiple nozzles for dispensing the adhesive from the adhesive applicator are used so that each pocketed coil spring or groups of springs may be followed with one or more nozzles over a limited range of movement. Furthermore, multiple nozzles offer the advantage of avoiding a single nozzle moving over a limited range with great speed or high frequency and thereby minimizing potential maintenance problems for the system while increasing the precision and accuracy of applying the adhesive. The individual nozzles may independently and selectively spray adhesive onto the string.

In certain embodiments, one or more sets of spaced nozzles dispense adhesive on the strings in parallel lines. The dispensing of the adhesive at least partially parallel to the direction of movement of the strings contributes to the speed of the application. Motion of the nozzles at least partially transverse to the direction of movement of the strings, particularly in the widest parts of the strings, contributes to more effective bonding. The individual nozzles of the groups may be independently and selectively controlled, on and off, to spray adhesive onto the strings in more effective patterns without applying excessive adhesive.

In various embodiments of this invention, the adhesive applicator moves over a limited range in a rotational manner or a reciprocating fashion which may include pivotal movement, linear translational movement or other types of movement. Further, in certain embodiments of the invention, the spray pattern on the string of pocketed coil springs is continuous and includes a greater amount of adhesive deposited on the central portion of each coil spring relative to the remainder of the adhesive pattern. This produces a greater bonding strength between the adjacent strings of pocketed coil springs because the central portion of each spring is typically the primary contact region between the strings of springs.

A continuous spray pattern on the string of pocketed coil springs, which results from the moving string and the moving adhesive applicator, allows for the coils in each string to be pushed together and adhesively bonded to one another before connecting the string to an adjacent string. As a result, the individual strings can be sized to a standardized dimension which results in a more uniform spring core. The continuous adhesive deposited on the side surface of the string of pocketed coil springs helps in stabilizing and sizing the entire spring unit in comparison to systems where the adhesive is only deposited at discrete locations on the middle or tangential regions of the arcuate spring pocket. Furthermore, movement of the strings and the adhesive applicator provides for a more continuous production system and method in the manufacture of the spring core unit.

Also in certain embodiments, the pattern of adhesive applied to the side of the moving string includes one or more lines which can be customized to change the deflection characteristics or feel of the resulting spring unit. In one form, sinusoidal lines of adhesive extend across groups of springs in each string so that the springs work as a sub-unit or block within the spring unit for individual deflection zone or regions.

In various embodiments of the invention, arrays of nozzles may be arranged relative to each other to apply adhesive in parallel lines, straight or curved. One or more groups of plural nozzles may be employed so that the nozzles within a group move together. Where more than one group of nozzles is used, the nozzles of one groups may be move differently relative to the nozzles of another group.

Different nozzles may be selectively switched on and off, under the control of a programmed controller. Groups of nozzles or individual nozzles within a group may be selectively switched on and off. As a result, precise control of the distribution of adhesive can be achieved.

As a result of the present invention, systems and methods for manufacturing spring core assemblies from adhesively bonded strings of pocketed coil springs are provided which improve the production capability for such spring units while increasing the accuracy or precision of adhesive application and improving the quality of those spring units by providing in one form a more standardized and unitary spring core assembly and in other forms customized spring core assemblies.

BRIEF DESCRIPTION OF THE DRAWINGS

The objectives and features of the invention will become more readily apparent from the following detailed description taken in conjunction with the accompanying drawings in which.

DETAILED DESCRIPTION OF THE INVENTION

Figure 1A:
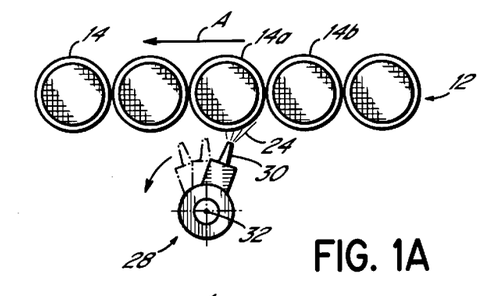
FIGS. 1A–1C are sequential schematic representations of one embodiment of this invention for applying adhesive from a moving adhesive applicator onto a moving string of pocketed coil springs.
Figure 1B:
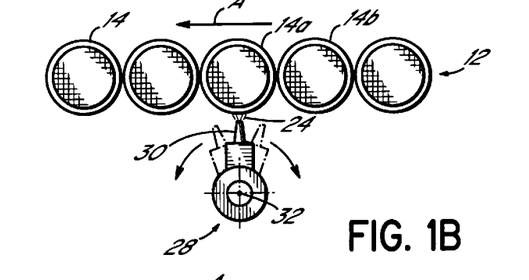
Figure 1C:
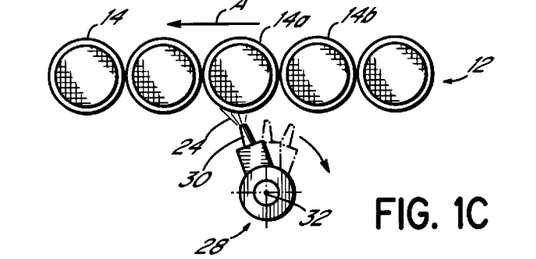
Figure 1D:
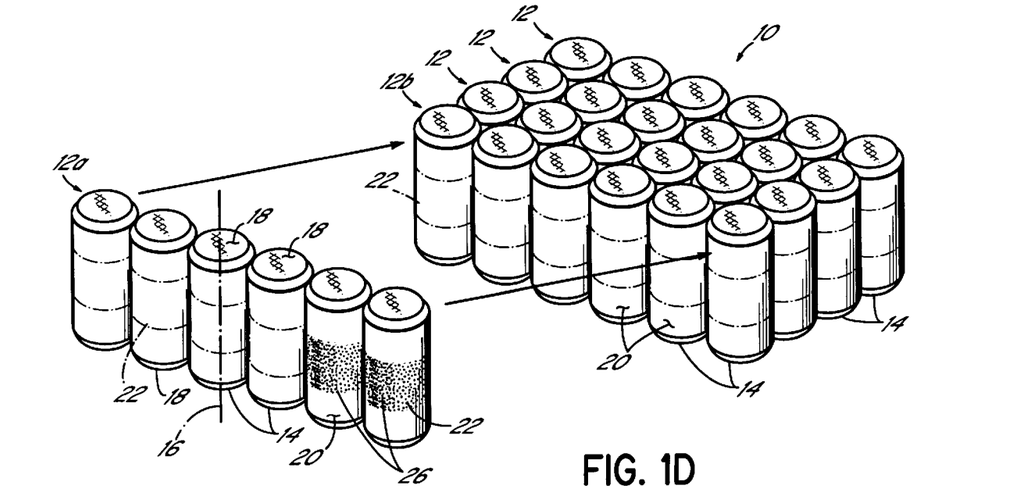
FIG. 1D is a schematic representation of a first string of pocketed coil springs being pushed into contact with a second string of pocketed coil springs having adhesive applied on a side surface thereof to form a spring core assembly.

Referring to FIG. 1D, a spring core unit 10 manufactured from strings of pocketed coil springs according to this invention is shown. The spring core 10 includes a plurality of strings 12 of pocketed coil springs 14. Each string 12 includes a plurality of pockets 14 encapsulating individual coil springs which are typically barrel-shaped with a plurality of normally spaced coils in which terminal end coils thereof have a smaller diameter than the intermediate coils. Alternatively, each pocket 14 may contain a compound nested coil spring or other spring designs as is well known in the art. Each pocketed coil spring 14 has a longitudinal axis 16 extending between the terminal end coils of each spring. Each pocket 14 for the coil springs has an upper and lower longitudinal end 18 spaced from a generally cylindrical or arcuate side surface 20 thereof. The strings 12 of pocketed coil springs 14 may be manufactured according to any known method or system such as the previously identified Spühl machines or the like.

The spring core 10 is assembled by moving a first string 12a of pocketed coil springs having the side surface 20 thereof with a pattern of adhesive 22 thereon into contact with a similar second string 12b of pocketed coil springs. The adhesive 24 in the pattern 22 bonds the first and second strings 12a, 12b together and the process is repeated with the desired number of strings 12 of pocketed coil springs 14 until a spring core 10 of a desired size is assembled.

The adhesive pattern 22 on the side surface 20 of the strings 12 of pocketed coil springs 14 in one form shown in FIG. 1D is preferably located generally equidistance between the longitudinal ends 18 of the pockets 14 and is continuous across the side surface 20 of the pocketed springs. The adhesive pattern 22 of FIG. 1D includes a region 26 of greater concentration of adhesive on each pocketed coil spring 14 which is located generally equidistance from the adjacent pocketed coil springs 14 of the string 12 or on the tangent of the pocketed coil spring 14. In other words, the region 26 of greater concentration of adhesive is generally located on the equator of the pocketed coil spring 14 and on a line perpendicular to the longitudinal axis of the string so that when the pocketed spring 14 is forced into contact with a similar shaped spring, the initial point of contact between them includes the region of greater concentration of adhesive 26 to thereby securely bond the strings 12 of pocketed coil springs 14 together. Preferably, only one side surface 20 of the string 12 of pocketed coil springs 14 is sprayed with the adhesive 24 so that as the strings 12 are sequentially assembled as shown in FIG. 1D, each string 12 is adhesively bonded to the previous string 12.

Referring to FIGS. 1A–1C, one embodiment of this invention is schematically and sequentially shown. The string 12 of pocketed coil springs 14 is moved on a conveyor or the like past a moving adhesive applicator 28 in the direction of arrow A generally parallel to the longitudinal axis of the string and perpendicular to the longitudinal axes 16 of the coil springs in the string 12. The movement of the adhesive applicator 28 may be rotational, reciprocating in a pivotal, translational or linear manner or any other type of movement. The adhesive applicator 28 includes a nozzle 30 for spraying adhesive 24 onto the side surface 20 of the moving string 12. Preferably, the adhesive 24, adhesive applicator 28 and nozzle 30 are selected from any one of a number of such components which are well known in the industry for this purpose.

Preferably, according to the embodiment in FIGS. 1A–1C, the adhesive 24 is continuously sprayed from the nozzle 30 which, reciprocates and pivots about a pivot axis 32 as shown sequentially in the drawings. Preferably, the adhesive 24 being sprayed from the nozzle 30 is directed to one individual pocketed coil spring 14a of the string 12 at a time. Specifically, as shown in FIG. 1A, as a specific pocketed coil spring 14a approaches the adhesive applicator 28, the nozzle 30 is directed to spray the side surface 20 of the pocketed coil spring 14a in a generally tangential orientation. As the specific pocketed coil spring 14a continues to travel in the direction of arrow A, the nozzle 30 pivots, as shown in FIG. 1B, so that the adhesive spray 24 is continually directed towards that pocketed coil spring 14a. When the pocketed coil spring 14a is immediately in front of the adhesive applicator 28, the nozzle 30 is directed generally perpendicular to the direction of travel of the string 12 and produces a generally radially directed spray on the pocketed coil spring 14a. Continued movement of the string 12 as shown in FIG. 1C is synchronized with continual pivoting of the nozzle 30 so that the spray 24 once again is in a generally tangential orientation relative to the circumference of the pocketed coil spring 14a. The nozzle 30 reciprocates back toward the position of FIGS. 1B and 1A sequentially for continuous spraying of the specific pocketed coil spring 14a and then a subsequent adjacent coil spring 14b approaching the adhesive applicator 28.

As a result of the coordinated movement of the adhesive applicator 28 and the string 12 of pocketed coil springs 14, the continuous pattern of adhesive 22 on the center part of the individual encased coil springs 14 is produced with the nozzle 30 substantially following and thereby spraying adhesive 24 onto each pocketed coil spring 14 as it passes the adhesive applicator 30. In one specific embodiment, the string 12 of pocketed coil springs 14 moves with a speed of approximately one meter per second which results in typically about 17 pocketed coil springs 14 per second moving past the adhesive applicator 30. As a result of the continuous spray 24 from the nozzle 30 and the movement of the adhesive applicator 30 relative to the moving string 12 of pocketed coil springs 14, primarily the radially directed spray as shown in FIG. 1B, the pattern of adhesive 22 on the string 12 produces the region of greater concentration 26 of adhesive as shown in FIG. 1D.

Figure 2A:
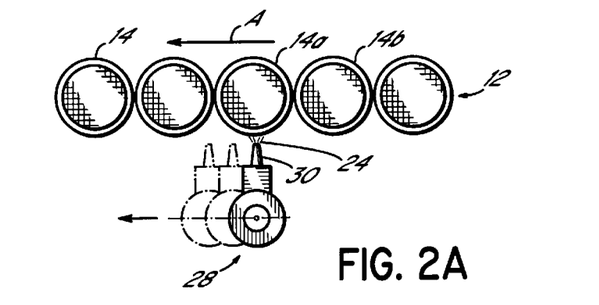
FIGS. 2A–2C are sequential schematic representations of an embodiment of this invention in which a single adhesive applicator reciprocates in a generally linear direction while applying adhesive to a moving string of pocketed coil springs.
Figure 2B:
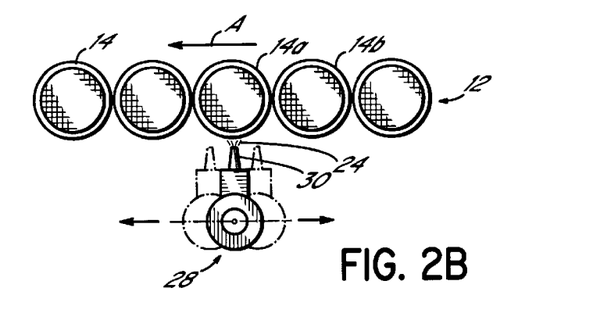
Figure 2C:
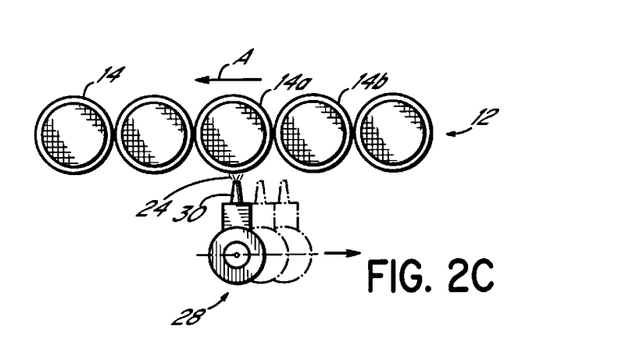
Figure 3:
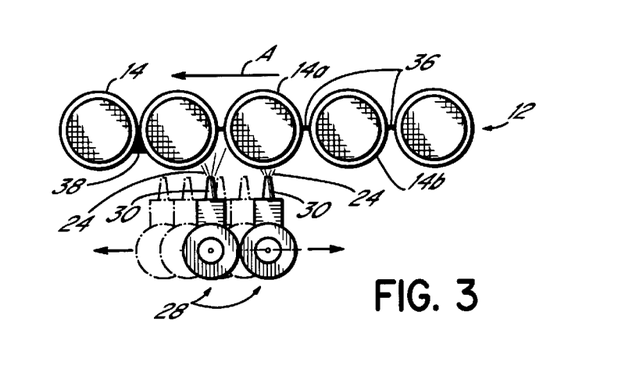
FIG. 3 is a schematic representation of an embodiment of this invention with multiple nozzles reciprocating in a generally linear direction while applying adhesive to the moving string of pocketed coil springs being sized by adhesively bonding adjacent coil springs together.

Referring to FIGS. 2A–2C and FIG. 3, alternative embodiments of this invention are shown in which the adhesive applicator 28 moves by reciprocating in a linear direction or path that is generally parallel to the direction of travel of the string 12 of pocketed coil springs 14. In the embodiment of FIGS. 2A–2C, the nozzle 30 is focused on generally the center region of a specific pocketed coil spring 14a and follows the movement of that pocketed coil spring 14a at preferably the same velocity, for example, one meter per second, until it reaches the position of FIG. 2C at which time it reciprocates back through the position shown in FIG. 2B toward the position of FIG. 2A for direct spray upon a subsequent adjacent pocketed coil spring 14b in the string 12. As a result, the region of greater concentration of adhesive 26 is produced on each pocketed coil spring 14 in the string 12 as well as the continuous spray pattern on the string 12 due to the reciprocating movement of the applicator 28. As shown in FIG. 3, a plurality of nozzles 30, two of which are shown in FIG. 3, may be mounted upon the adhesive applicator 28 for direct and continuous spray on the string 12 of moving pocketed coil springs 14.

Figure 4A:
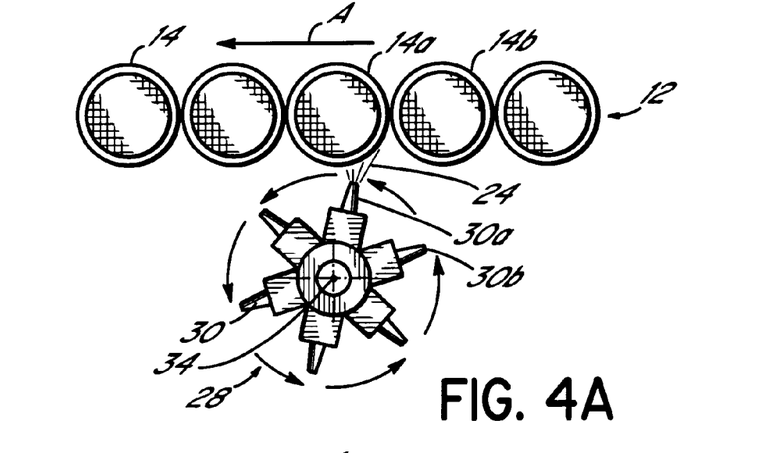
FIGS. 4A–4C are sequential schematic representations of another embodiment of this invention in which an adhesive applicator includes a plurality of rotating nozzles spraying adhesive onto a string of moving pocketed coil springs.
Figure 4B:
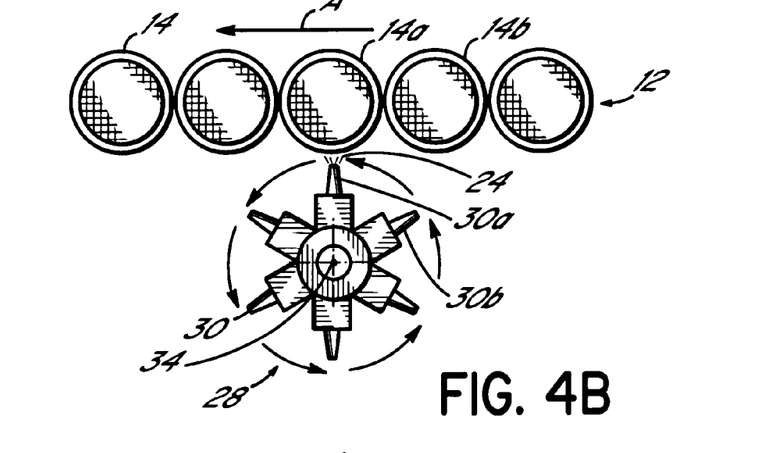
Figure 4C:
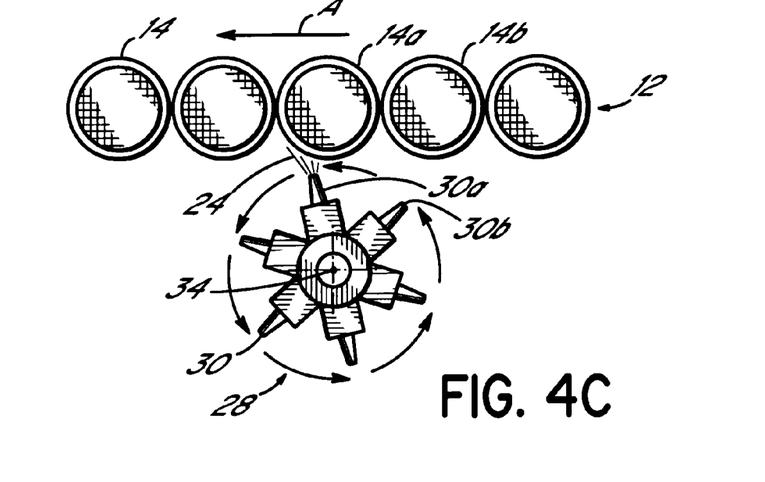

Referring to FIGS. 4A–4C, an embodiment is shown in which the adhesive applicator 28 includes a plurality of nozzles 30, six of which are shown, which rotate about an axis 34. The adhesive applicator 28 in this embodiment includes multiple nozzles 30, only one of which is activated at any given time for spraying the adhesive 24 onto the moving string 12 of pocketed coil springs 14 so that the adhesive 24 from the active nozzle 30a is sprayed onto a single pocketed coil spring 14a as it moves past the adhesive applicator 28. Once the particular nozzle 30a reaches the approximate position relative to the particular pocketed coil spring 14a shown in FIG. 4C, the adhesive 24 ceases to be sprayed from that nozzle 30a and begins to be discharged from the subsequent adjacent nozzle 30b and directed onto the subsequent adjacent pocketed coil spring 14b and the process begins once again as shown in FIG. 4A. Advantageously, the system of FIGS. 4A–4C produces a continuous adhesive pattern 22 on the string 12 of pocketed coil springs 14 which includes a region of greater concentration of adhesive 26 along the central part of each pocketed coil spring 14 as shown in FIG. 1D. As will be readily apparent to one of ordinary skill in the art, to produce the adhesive pattern 22 as described, the movement of the adhesive applicator 28, whether pivotal, rotation, translational or the like, is preferably coordinated with the movement of the string 12 of pocketed coil springs 14.

Figure 5:
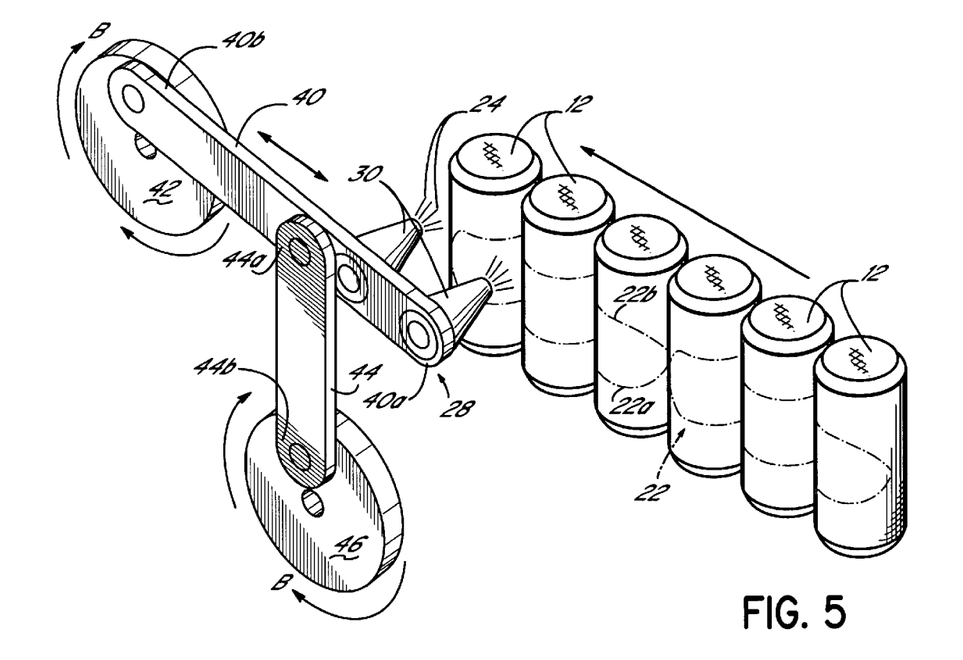
FIG. 5 is a schematic representation of another embodiment of this invention with multiple nozzles moving and spraying adhesive onto a moving string of pocketed coil springs into a pattern on the strings.

A still further advantage of the present invention is shown in FIG. 3. Particularly, known strings 12 of pocketed coil springs 14 include lateral seams 36 joining the adjacent pocketed coil springs 14 together. Due to the nature of the pocketing material and the string of pocketed coil springs, the length of the string 12 of a particular number of pocketed coil springs 14 may not be consistent because of the stretching of the fabric or the capability of the string 12 to be expanded by increasing or decreasing the spacing between the adjacent pocketed coil springs 14. A particular advantage of the system and method according to this invention is that the adjacent pocketed coil springs 14 in the string 12 may be adhesively bonded together to thereby standardize or size the length of each string 12. Specifically, the pattern of adhesive 22 sprayed onto the string 12 is generally continuous, a portion 38 of which is sprayed onto the region of the pocketed coil springs 14 adjacent to one another (i.e., bordering the region of greater adhesive concentration and adjacent the seams 36). Therefore, the adjacent pocketed coil springs 14 can be adhesively bonded together by this region of adhesive 38 by forcing the adjacent pocketed coil springs 14 together at a single location for each string 12 as shown in FIG. 3 or at multiple locations for each string 12. As a result, the length of the string 12 of pocketed coil springs 14 can be standardized or sized for a more uniform spring core 10 having standardized and sized strings 12 of pocketed coil springs 14. Referring to FIG. 5, an embodiment is shown in which the adhesive applicator 28 which includes a plurality of nozzles 30, two of which are shown, are mounted upon a first link 40 proximate a first end 40a of the link 40. An opposite end 40b of the link 40 is pivotally coupled to a rotating disk, wheel or other rotational member 42 which rotates in a first direction indicated by arrow B. A second link 44 is pivotally coupled at a first end 44a to the first link 40 and pivotally coupled at a second opposite end 44b to a second rotating disk, wheel or other rotational member 46 which rotates in a similar direction as that of the first disk 42. The adhesive 24 is supplied to the individual nozzles 30 through a supply line (not shown) as will be readily understood by those of ordinary skill in the art.

As a result of the coordinated rotation of the disks 42, 46 and the movement of the links 40, 44 and nozzles 30 mounted thereon, the adhesive 24 sprayed from the moving nozzles 30 produces a desired pattern 22 on the moving string 12 of pocketed coil springs 14. In one form, the pattern 22 includes a first line 22a of adhesive 24 in a sinusoidal or modified sinusoidal arrangement and a second line 22b of adhesive 24 which is exactly out of phase with the first line 22a but likewise in a sinusoidal or modified sinusoidal arrangement as shown in FIGS. 5 and 6A–6C. Each of the lines 22a, 22b is formed by one of the nozzles 30.

Figure 6A:
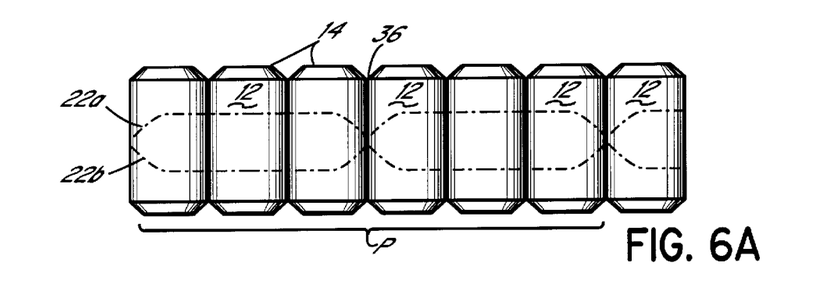
FIGS. 6A–6D are side elevational views of strings of pocketed coil springs with adhesive applied thereto in various patterns.
Figure 6B:
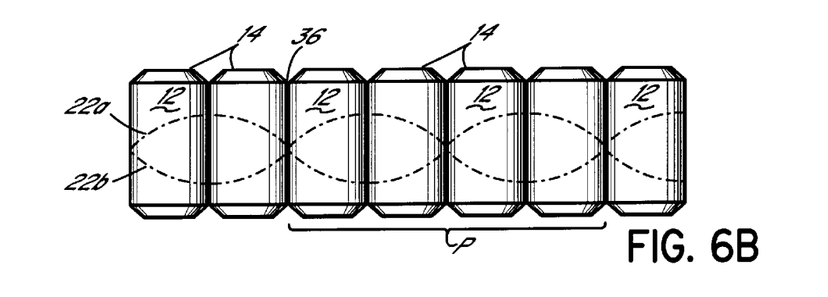
Figure 6C:
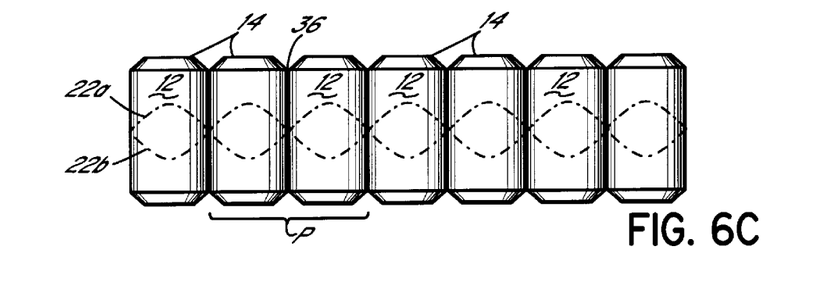

Specifically referring to the adhesive pattern shown in FIGS. 6A and 6B, the sinusoidal or modified sinusoidal lines 22a, 22b have a period P which extends over multiple pocketed coil springs 14 in the string 12. Specifically, the period P of each of the lines 22a, 22b of adhesive in the pattern of FIG. 6A extends over six pocketed coil springs 14; whereas, the period P of each line 22a, 22b of adhesive in the pattern 22 of FIG. 6B extends over four pocketed coil springs 14. It should be readily appreciated that the patterns 22 of adhesive 24 shown and described herein are exemplary only and may take numerous other forms within the scope of this invention. As shown in FIG. 6C, the adhesive pattern 22 may include lines 22a, 22b of adhesive which have a period P of only two springs 12. However, particularly with respect to adhesive patterns 22 of FIGS. 6A and 6B and similar adhesive patterns, the pocketed spring coils 14 grouped together in a single period P of the lines 22a, 22b of adhesive work together as a block of two, three or more coils when the strings 12 are assembled into a spring core assembly 10. Specifically, because of the intersection of the lines 22a, 22b of adhesive occur approximately at a transverse or lateral seam 36 adjoining adjacent pocketed springs 14, the grouping of three pocketed coil springs 14 of FIG. 6A and of two pocketed coil springs 14 of FIG. 6B combine with similarly positioned pocketed coil springs 14 and adjacent strings 12 to form a block of springs 14 which offer differential spring deflection characteristics relative to the adjacent block or grouping of pocketed coil springs 14. Therefore, the resulting spring core assembly 10 may include multiple zones, groupings or blocks of springs which may provide individual spring deflection regions or zones in the spring assembly for a customized spring unit 10. Because of the position of the intersection of the lines 22a, 22b of adhesive in the pattern 22 occurs at the seam 36, the adhesive 24 does not limit the movement of the adjacent springs 14 and blocks thereof on either side of the point of intersection.

Figure 5A:
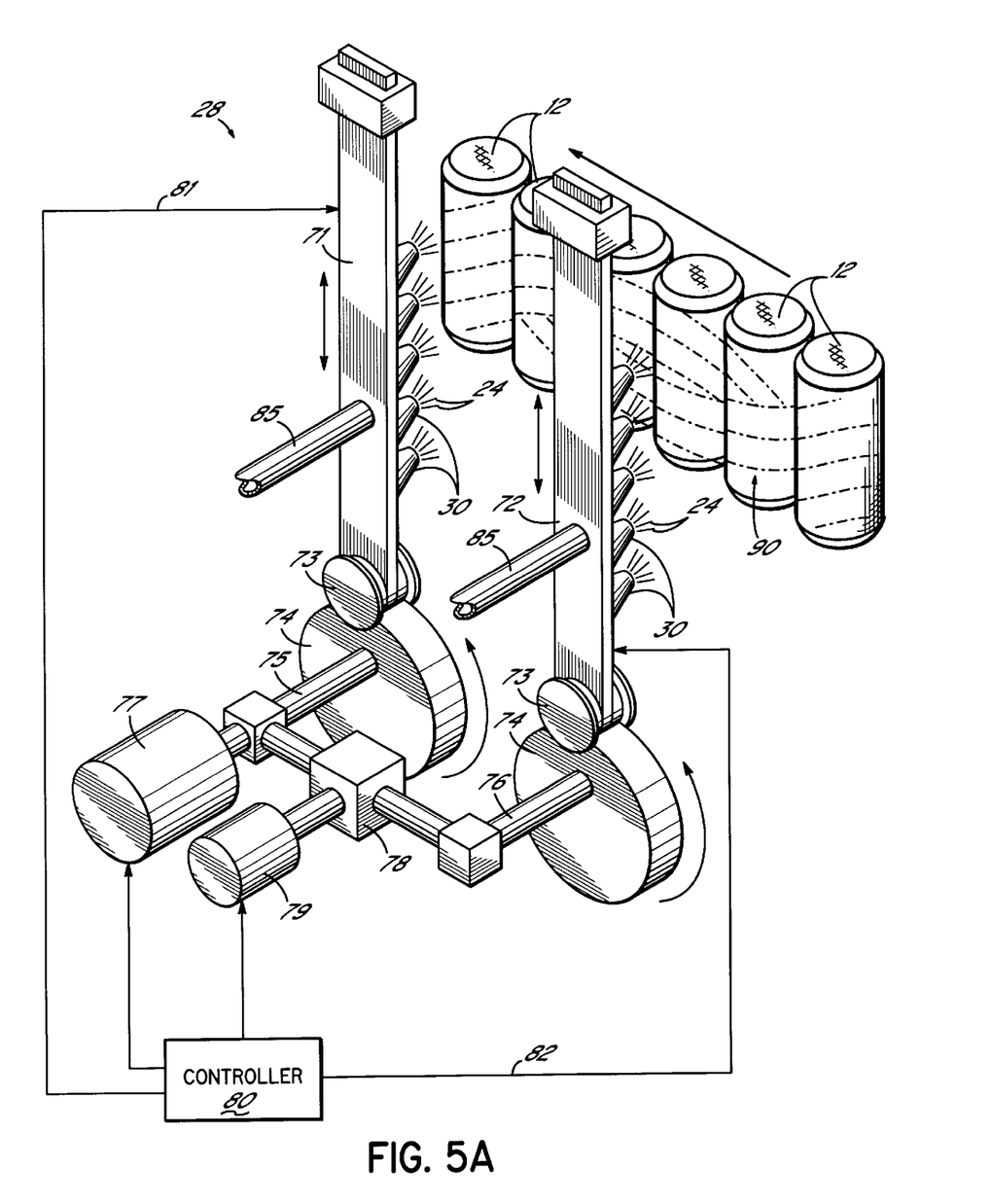
FIG. 5A is a schematic representation of a further embodiment of the invention with multiple nozzles moving in parallel and spraying adhesive onto a moving string of pocketed coil springs in patterns of parallel lines on the strings.

FIG. 5A illustrates a further embodiment in which the adhesive applicator 28 includes a plurality of nozzles 30 fixed to each of two vertically extending manifolds 71 and 72. Each of the manifolds 71, 72 is slidably mounted so as to be vertically moveable. At the lower end of each manifold 71,72 is a cam follower 73, that is driven by a rotating cam 74 on the end of a respective drive shaft 75,76, so that the manifolds 71,72 are reciprocated vertically by the action of the cams 74 at the ends of the respective drive shafts 75,76. The drive shaft 75 is directly driven by a motor 77, while the drive shaft 76 is coupled to the motor 77 through a differential drive 78 which has a differential input driven by a servo motor 79. The motor 77 is energized under the control of a programmed controller 80 to drive the cam 74 on the shaft 75 either in a uniform rotary motion or according to some other desired motion that will scan the strings in a desired pattern. The servo motor 79 is also energized under the control of the programmed controller 80 to drive the cam 74 on the shaft 76 in a modified motion in relation to the motion of the cam 74 on the shaft 75. As a result, the two manifolds 71, 72 reciprocate vertically in different motions under the control of the controller 80.

Adhesive 24 is supplied to the individual nozzles 30 from a supply line 85 which connects to each of the nozzles 30 through an individually controllable valve (not shown) within the manifolds 71,72. The nozzles 30 are turned on or off, or the rate of flow through them is otherwise regulated, by signals from the controller 80 through control cables 81,82 from the controller 80. The nozzles may thus be operated to dispense either continuous or discontinuous lines of adhesive.

Figure 6D:
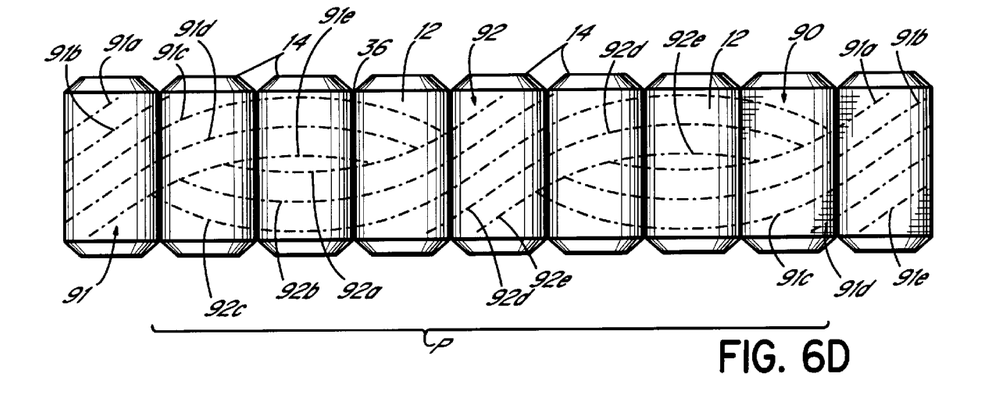

As a result of the coordinated reciprocation of the manifolds 71,72, the adhesive 24 sprayed from the moving nozzles 30 produces a desired pattern of parallel lines 90 (FIG. 6D) of adhesive 24 on the moving string 12 of pocketed coil springs 14. In one form, the pattern 90 includes a first set of parallel lines 91 of adhesive 24 in a sinusoidal or modified sinusoidal arrangement, produced by the nozzles of the first manifold 71, and a second set of parallel lines 92 of adhesive 24 that is out of phase with the first set and likewise in a sinusoidal or modified sinusoidal arrangement, as shown in FIG. 6D. Each of the sets 91, 92 of lines is formed by one of the nozzles 30.

Specifically referring to the adhesive pattern shown in FIG. 6D, the sinusoidal or modified sinusoidal lines 91, 92 have a period P which extends over multiple pocketed coil springs 14 in the string 12. Specifically, the period P of each of the sets of lines 91, 92 of adhesive in the pattern of FIG. 6D extends over several pocketed coil springs 14. As shown in FIG. 6C, the adhesive pattern 22 may include lines 22a, 22b of adhesive which have a period P of only two springs 12. However, particularly with respect to adhesive patterns 22 of FIGS. 6A and 6B and similar adhesive patterns, the pocketed spring coils 14 grouped together in a single period P of the lines 22a, 22b of adhesive work together as a block of two, three or more coils when the strings 12 are assembled into a spring core assembly 10. The patterns are controlled by signals from the controller 80 to the drive motor 77 and servo motor 79.

In FIG. 6D, the set of lines 91 is shown to contain five parallel lines 91a–91e, while the set of lines 92 is shown to contain five parallel lines 92a–92e, each from a different nozzle 30 of the manifolds 71,72. As the string moves past the manifolds, the nozzles are switched on and off in response to signals from the controller 80 on lines 81 and 82. For example, as the portion of the string to the left in the figure passes the manifold 71, all five nozzles 30 on the manifold 71 are open. Then, the nozzles 30 producing lines 91a and 91b are sequentially turned off, while the nozzles 30 producing lines 92c, 92b and 92a are sequentially switched on. Then nozzles 30 producing lines 91e, 91d and 91c are sequentially turned off and those producing lines 92d and 92e are turned on. Then, the patterns of lines produced by the different manifolds 71,72 change positions, and the nozzles 30 producing lines 92a and 92b are sequentially turned off, nozzles 30 producing lines 91c, 91b and 91a are sequentially switched on. Then those producing lines 92e, 92d and 92c are sequentially turned off and those producing lines 92d and 92e are turned on.

The controller 80 that controls the on/off of the nozzles 30 also applies to other embodiments discussed above, and particularly that of FIG. 7 discussed below.

Figure 7:
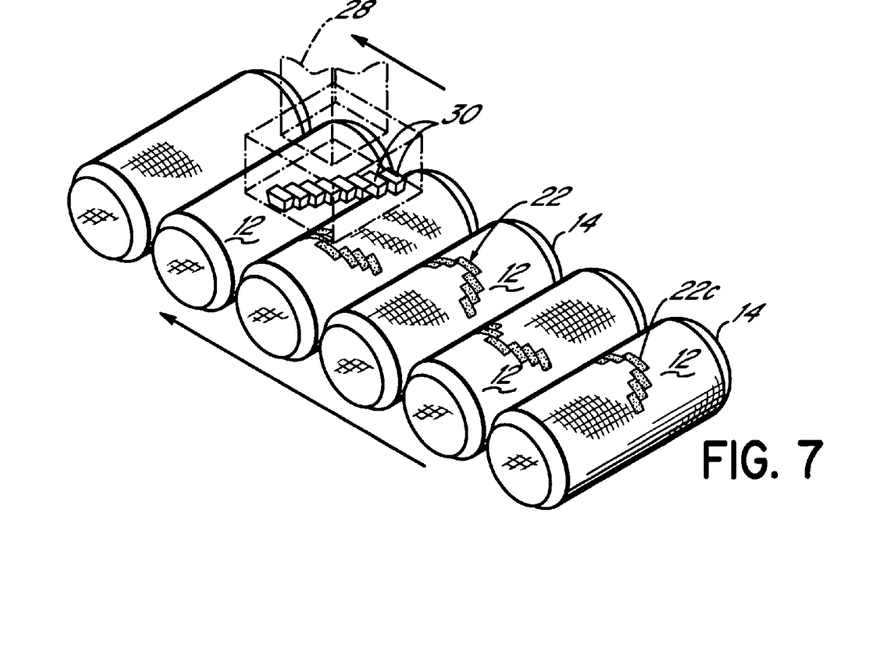
FIG. 7 is a schematic representational view of an embodiment of this invention in which a moving adhesive applicator includes a plurality of spray heads for applying adhesive in a pattern onto a moving string of pocketed coil spring.

Referring to FIG. 7, an embodiment is shown in which the adhesive applicator 28 includes a plurality of nozzles 30, eight of which are schematically shown in FIG. 7. The adhesive applicator 28 in this embodiment translates linearly in a direction generally parallel to the direction of travel of the string 12. Similar to the embodiments shown in FIGS. 2A–2C and 3, the adhesive applicator 28 translates within a limited range and reciprocates back and forth within that range while applying adhesive 24 in a pattern 22 to the moving string 12. Importantly, with respect to the embodiment shown in FIG. 7, the speed of the traveling adhesive applicator 28 is slower than that of the moving string 12 of springs 14. For example, the string 12 of pocketed coil springs 14 typically moves with a speed of approximately one meter per second which results in about 17 pocketed coils springs 14 per second moving past a fixed location. As such, the rate of travel of the moving adhesive applicator 28 of FIG. 7 would be less than one meter per second, for example about 0.5–0.75 meters per second. This relatively slower rate of travel of the adhesive applicator 28 achieves a greater precision in positioning the adhesive 24 onto the moving string 12 without slowing or retarding the travel of the string 12 and thereby detrimentally impacting the production, efficiency and capability of the overall system. The movement of the adhesive applicator 28 allows for increased time to apply the adhesive 24 in a pattern 22 onto the string 12, preferably in a more precise and accurate manner to achieve the desired pattern 22 while still maintaining a high speed of production.

Figure 8:
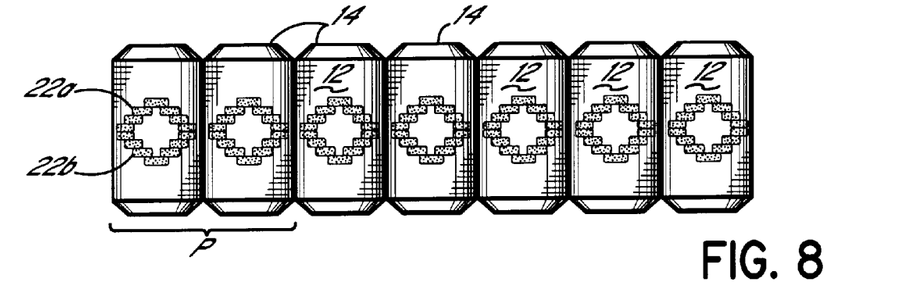
FIGS. 8 and 9 are side elevational views of patterns of adhesive applied onto the side of a string of pocketed coil springs.
Figure 9:
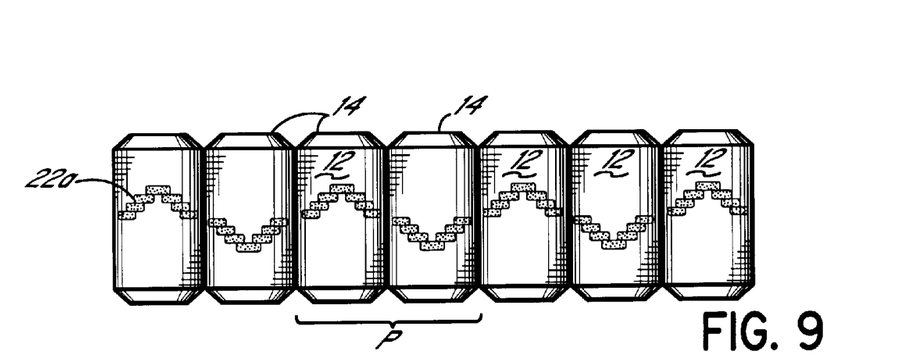

Each nozzle 30 shoots or dispenses the adhesive 24 with great accuracy onto a specified portion of the moving string 12. Preferably, the individual nozzles 30 are selectively and independently cycled on/off to spray a deposit 22c of adhesive onto the string 12 with great precision and accuracy. As such, the precisely positioned deposits 22c combine or merge to form the lines 22a, 22b and generally the pattern 22 of adhesive. Adhesive patterns 22 which can be produced in the system of FIG. 7 are shown in FIGS. 8 and 9 in which FIG. 8 includes a pair of sinusoidal adhesive lines 22a, 22b directly out of phase; whereas, the pattern of FIG. 9 includes a single line 22a of adhesive 24 in a sinusoidal pattern 22. In both FIGS. 8 and 9, the period P of each sinusoidal line of adhesive is two pocketed coil springs.

From the above disclosure of the general principles of the present invention and the preceding detailed description of preferred embodiments, those skilled in the art will readily comprehend the various modifications to which this invention is susceptible. Therefore, we desire to be limited only by the scope of the following claims and equivalents thereof.

We claim:

1. A method for manufacturing a spring core comprising the steps of:

providing a first string of pocketed springs, the springs having longitudinal axes which are substantially parallel to each other;

moving the first string past an adhesive applicator and in a direction generally perpendicular to the longitudinal axes of the springs;

spraying an adhesive from the adhesive applicator onto a side surface of the moving pocketed springs;

moving the adhesive applicator so that the adhesive being sprayed therefrom forms a pattern on the side surfaces of the pocketed springs;

the applicator moving and adhesive spraying steps being carried out under the control of a programmed controller;

moving the first string relative to a similar second string of pocketed springs so that the sprayed side surface of the second string contacts the first string and thereby adhesively bonds the first and second strings together; and repeating the steps until the spring core of a desired size is manufactured.

2. The method of claim 1 wherein the spraying further comprises spraying the adhesive in a plurality of parallel lines from a plurality of nozzles on the adhesive applicator.

3. The method of claim 2 wherein the adhesive is selectively sprayed from the nozzles of the plurality under the control of the programmed controller.

4. The method of claim 1 further comprising:

bonding at least selected ones of the pocketed springs of the first string to adjacent pocketed springs of the first string to thereby regulate a length of each string of pocketed springs.

5. A method for manufacturing a spring core comprising the steps of:

providing a first string of pocketed springs, the springs having longitudinal axes which are substantially parallel to each other;

moving the first string past an adhesive applicator and in a direction generally perpendicular to the longitudinal axes of the springs;

spraying an adhesive from the adhesive applicator onto a side surface of the moving pocketed springs;

moving the adhesive applicator so that the adhesive being sprayed therefrom forms a pattern on the side surfaces of the pocketed springs;

the spraying including spraying the adhesive in a plurality of parallel lines from a plurality of nozzles on the adhesive applicator;

moving the first string relative to a similar second string of pocketed springs so that the sprayed side surface of the second string contacts the first string and thereby adhesively bonds the first and second strings together; and repeating the steps until the spring core of a desired size is manufactured.

6. The method of claim 5 wherein the adhesive is selectively sprayed from the nozzles of the plurality under the control of a programmed controller.

7. The method of claim 5 further comprising:

bonding at least selected ones of the pocketed springs of the first string to adjacent pocketed springs of the first string to thereby regulate a length of each string of pocketed springs.

* * * * *